Patented Feb. 25, 1930

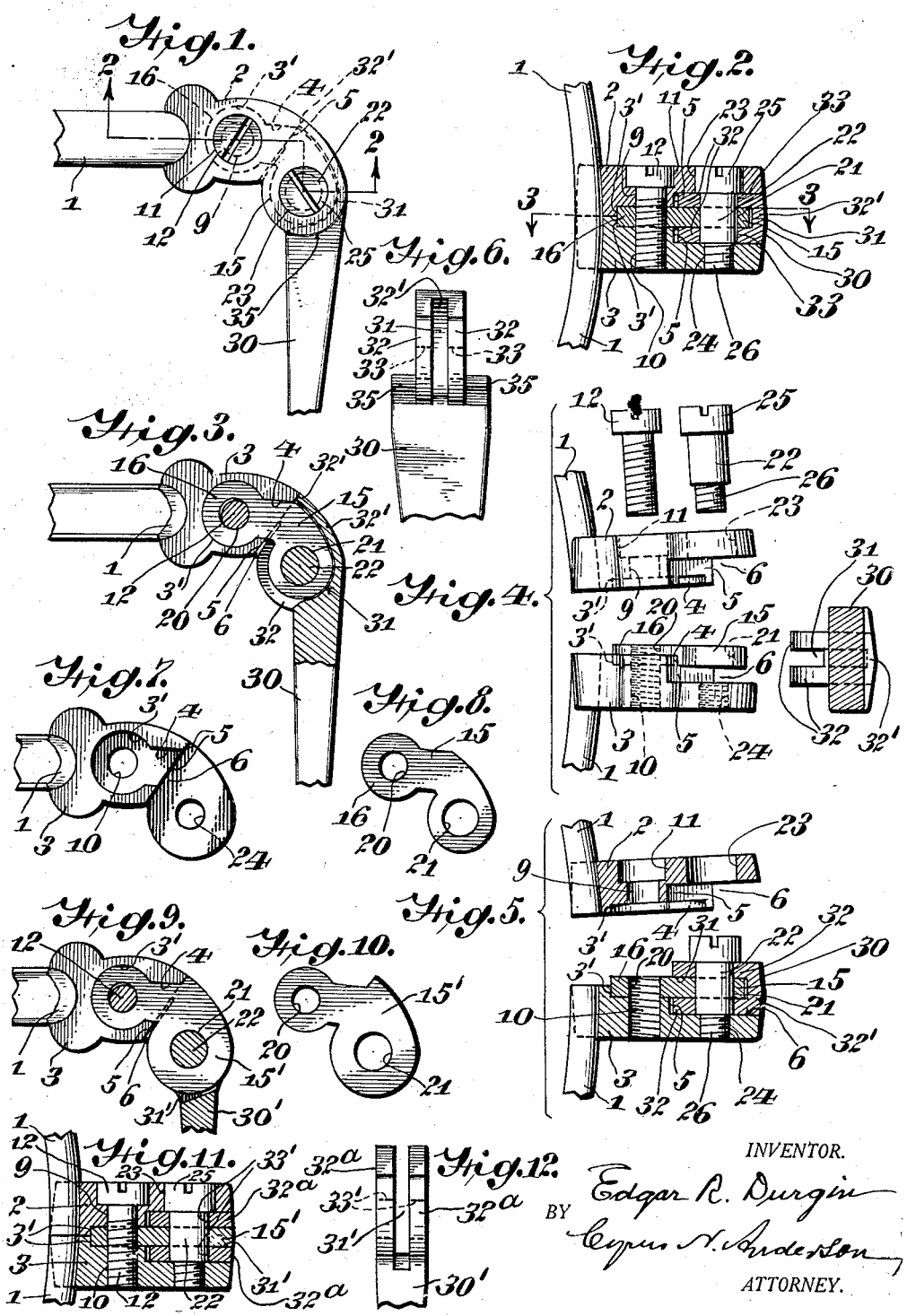

1,748,281

UNITED STATES PATENT OFFICE

EDGAR R. DURGIN, OF NEWARK, NEW JERSEY, ASSIGNOR, BY MESNE ASSIGNMENTS, TO CONTINENTAL OPTICAL MANUFACTURING COMPANY, OF INDIANAPOLIS, INDIANA, A CORPORATION OF INDIANA

OPHTHALMIC MOUNTING

Application filed October 25, 1926. Serial No. 143,855.

My invention relates to ophthalmic mountings of the character in which means is provided for effecting an increase in the friction between the pivot end of a temple wire and the temple lug with which the same may be connected.

The invention has for its general object to provide a construction of the character indicated having novel means for increasing the friction between the pivot end of the temple wire and the temple lugs with which the same may be connected.

It also is an object of the invention to provide means whereby the joint between the pivot end of a temple wire and the temple lug or lugs is rendered relatively inconspicuous.

Other objects and advantages of the invention will be pointed out in the detailed description thereof which follows, or will be apparent from such description.

In order that the invention may be readily understood and its practical advantages fully appreciated, reference should be had to the accompanying drawing in which I have illustrated certain forms of convenient embodiments thereof. However, it will be understood that the invention is susceptible of embodiment in other forms of construction than those shown and that various changes may be made in the details of construction within the the scope of the claims appended hereto without departing from the invention or the principle thereof.

In the drawing,—Fig. 1 is a view in top plan of one end portion of the frame of a pair of eye glasses, the connection between the temple wire and the temple lug embodying the invention;

Fig. 2 is a vertical sectional view taken on the broken line 2—2 of Fig. 1;

Fig. 3 is a horizontal sectional view taken along the broken line 3—3 of Fig. 2;

Fig. 4 is a view in rear elevation of one end portion of a lens rim provided with the invention, the said view also showing the temple wire or bar in cross section, the several parts illustrated in said figure being shown in spaced relation to each other, ready to be assembled;

Fig. 5 is a view similar to that shown in Fig. 4 but showing the temple wire assembled with the lug upon one end of the lens rim;

Fig. 6 is a view in inside elevation of the front or pivot end portion of a temple wire;

Fig. 7 is a view in elevation of one end of a lens rim and of the inner side of a lug secured thereto;

Fig. 8 is a view in the side elevation of an intermediate member adapted to be mounted between the lugs secured to the adjacent separable opposing ends of a lens rim;

Fig. 9 is a view similar to that shown in Fig. 3 but showing a slightly modified structure embodying the invention;

Fig. 10 is a view of an intermediate member similar to that shown in Fig. 8 but of different construction and shape to adapt it for use in the construction shown in Fig. 9;

Fig. 11 is a view similar to that shown in Fig. 2 but showing the modified construction depicted in Fig. 9;

Fig. 12 is a view in inside elevation of the modified end portion of a temple wire adapted for use in the construction illustrated in Figs. 9, 10 and 11.

In the drawings I have shown one end portion only of a spectacle frame because the opposite end thereof, including the temple lug and the pivot end portion of the temple wire, is identical in construction.

The lens rim 1 terminates in the adjacent separable opposing ends in the usual manner as is illustrated in the drawing. To each of these adjacent opposing ends lugs 2 and 3 are connected in known manner by soldering or otherwise. Each of the lugs 2 and 3 is provided with relatively shallow depressions comprising a portion 3' of circular formation from which a relatively narrow channel 4 extends which terminates at the shoulder 5 produced as a result of the cutting away of a substantial portion of the inner side of the outer end portion thereof as indicated at 6. The cutting away of these portions provides a relatively wide space for the reception of the pivot end of the temple wire or bar which may be secured thereto.

In both forms of construction the lugs 2 and 3 are provided with holes 9 and 10 extending therethrough. The outer end portion of the hole 9 terminates in an enlarged portion 11 within which the head of a fastening screw 12 is adapted to be seated as shown in Figs. 2 and 11. The hole 10 is screw-threaded and is adapted to be engaged by the screw-threaded end portion of the fastening screw 12.

In Figs. 1 to 8 inclusive of the drawing I have provided a relatively narrow intermediate member 15 which is located between the lugs 2 and 3 and the outer end of which projects into the relatively wide space between the outer end portions of the lugs 2 and 3 which space is formed by the cutout portions 6, to which previous reference has been made. The inner end 16 of the intermediate member 15 is circular to adapt it to fit the circular seat or depression 3', it being understood that preferably the thickness of the circular end portion 16 of the intermediate member 15 is greater than the depth of the depression in the respective lugs 2 and 3. In consequence of this relationship the inner end portion of the member 15 engages with both the lugs 2 and 3. The member 15 may or may not, as may be preferred, be permanently secured to the lug 3. The inner end portion of the member 15 is provided with a hole 20 through which the fastening screw 12 extends. The intermediate member 15 is provided near its middle with a neck portion which is adapted to fit the complemental portions 4 of the recesses in the lugs 2 and 3. The outer end portion of the member 15 is provided with a hole 21 through which the pivot pin 22 extends. In alinement with the hole 21 holes 23 and 24 are provided in the outer end portions of the lugs 2 and 3. The hole 23 is of a size to receive the head 25 of the pivot pin 22. The hole 24 preferably is of reduced size and is screw-threaded for the reception of, and engagement with, the screw-threaded end 26 of the pivot pin 22. The temple wire or bar 30 is provided with a pivot end or projection which is slotted as indicated at 31 to form ears 32 in spaced relation to each other. The width of the slot 31 is such that the outer end portion of the intermediate member 15 fits closely therein, the fit, however, permitting relative moving between the ears 32 and the said member. The slot 31 does not extend entirely through the pivot end of the temple wire, in consequence of which the outer side of the pivot end of the temple wire or bar is smooth and unbroken as indicated at 32'.

The ears are provided with holes 33 which extend therethrough which holes, when the temple wire or bar is assembled with the lugs 2 and 3 (which combined constitute what is generally known as the temple lug) are in alinement with openings 23 and 24. When the temple wire or bar is connected with the temple lug the end portion of the intermediate member 15 is located within the slot 31 and is concealed from view when the temple wires are in open or extended position by the portion 32'. The inner outer end portions of the ears 32 and the outer end of the portion 32' constitute, in effect, a shoulder which, when the temple wires or bars are in open or extended position contacts with the outer end portions of the shoulders 5 previously mentioned.

It will be apparent from an inspection of the drawing that in the form of construction shown in Figs. 1 to 8 inclusive the intermediate members 15 are completely concealed when the temple bars are in open or extended position as shown in Figs. 1 and 2. This is due to the presence of the portion 32' previously referred to and also to the fact that the width and area of the ears 32 are greater than the width and area of the outer half portion of the said intermediate member 15.

It will be noted that the thickness of the pivot end portion or projection of the temple wire or bar 30 is considerably less than that of the adjoining portion of the said bar so that shoulders 35 are formed, which shoulders are curved to fit against the curved outer end surfaces of the lugs 2 and 3, as shown in Fig. 1 of the drawing. The portion of said temple wire or bar adjacent the temple lug to which it is connected is of a width equal to the distance between the outer surfaces of the outer end portion of said lug.

In Figs. 9 to 12 inclusive, a modified construction is shown in which the inner end portion of the intermediate member 15' is of substantially the same shape and formation as the corresponding portion of the intermediate member 15. The intermediate member 15' is held in position between the lugs 2 and 3 and may or may not be permanently secured, as may be preferred, to the lug 3. The outer end or half portion of the intermediate member 15' is of greater width and area than the corresponding portion of the member 15 in consequence of which it is necessary that the slot 31' in the temple wire or bar 30' extend entirely through the pivot end portion of the said wire or bar, so that the said slot is visible from the outer side of the said temple bar. The outer edge of the intermediate member 15' is of the same shape as, and is complementary with, the corresponding edges of the lugs 2 and 3, located on opposite sides thereof.

The ears 32[a] are provided with holes 33' through which the pivot pin 22 passes as is shown clearly in Fig. 11 of the drawing. The pivot pin in this construction is identical with the pivot pin 22 employed in connection with the construction shown in Figs. 1 to 8 inclusive. In the form of construction as shown in these Figs. 9 to 12 inclusive, the pivot end portion of the temple wire or bar is of substantially the same thickness or width as the adjacent portion thereof so that there are no shoulders between the pivot end and the adjoining portion of said wire or bar as in the construction illustrated in Figs. 1 to 8 inclusive. The outer edges of the ears 32ª, when the temple wire is in open or extended position, are flush with the adjoining edges of the lugs 2 and 3 and of the member 15', so that at such time the joint between the temple wire or bar and the temple lugs present a smooth outer surface.

In both forms of construction the lugs 2 and 3 are of equal thickness and the intermediate member 15 or 15' is located medially thereof.

Upon removal of the fastening screw 12 in both forms of construction, it will be apparent that the adjacent ends of a lens rim may be separated from each other for the purpose of inserting or removing a lens without the necessity of removing the pivot pin or bolt 22. This fact is quite obvious from an inspection of Fig. 5 of the drawing and is rendered possible by reason of the fact that the head 25 of the pin bolt 22 fits loosely in the opening 23 in the outer end portion of lug 2. The latter therefore may, upon removal of the fastening screw 12, be separated from the head 25 as shown in Fig. 5. A temple wire or bar may be removed from a temple lug merely by the removal of a pivot pin 22 without disturbing the fastening screw 12 or the lens within a rim to which said lug is secured.

The outer and side surfaces of the metal lens rims in both forms of construction may be incased in or covered by thin strips of zylonite or other similar nonmetallic substance.

Having thus described my invention, what I claim and desire to secure by Letters Patent, is:

1. An ophthalmic mounting comprising lugs secured to the adjacent ends of a lens rim each of which lugs is provided upon the inner side of its outer end portion with inwardly extending notches, the said notches being complementary to each other and forming a relatively wide space between the outer end portions of said lugs, and each of said lugs being provided with a depression extending inwardly from the inner ends of the said notches, an intermediate member having its inner end portion mounted in the said depressions and its outer end portion extending into the space between the outer end portions of the said lugs, holes extending through the lugs and through the inner end of the said intermediate member, fastening means removably mounted in the said hole for securing the said lugs and the said intermediate member together, a temple bar having a slot extending horizontally through its pivot end, the said pivot end being located between the outer ends of the said lugs and the outer end portion of the said intermediate member extending into the said slot, holes extending through the outer end portion of the said lug and through the outer end portion of the said intermediate member, the said holes being in registry with each other, and a pivot pin in the said holes for pivotally connecting the temple bar to the said lugs.

2. An ophthalmic mounting comprising a lens rim having lugs secured upon the adjoining opposing ends thereof, which lugs are of equal thickness, means for detachably securing the said lugs together and each of said lugs being provided upon the inner side of its outer end portion with an inwardly extending notch, which notches are complementary to each other and forming a slot when the lugs are fastened together which extends inwardly from the outer end thereof, and each of the said lugs also being provided with depressions extending inwardly from the inner ends of the said notches, an intermediate member mounted in the said depression, the outer end portion of said member extending into the said slot, a temple bar having a pivot end portion of less width than the adjoining portion of said bar, said pivot end portion being provided with a slot the outer side of which is closed, which slot is adapted to be engaged by the outer end portion of the said intermediate member when the pivot end is placed within the slot between the outer end portions of the said lugs, the outer end portions of the said lugs, the outer end portion of the said intermediate member and the pivot end portion of the said temple bar being provided with holes extending therethrough and a pivot pin mounted in said holes for pivotally connecting the temple bar to the said lugs.

3. An ophthalmic mounting comprising lugs secured to the adjacent ends of a lens rim, which lugs are of equal thickness and are provided respectively upon the inner sides of their outer end portions with horizontal and inwardly extending notches, and also being provided respectively with depressions in opposing relation to each other upon the inner sides of the inner end portions thereof, the outer ends of said depressions terminating at the inner walls of said notches, the said depressions and the said notches being complementary to each other, an intermediate member having its inner end portion fitted within the recess formed by the complementary depressions when the lugs are secured together, the outer end portion of the said intermediate member projecting into the space formed by the said notches, the said lugs having holes extending therethrough near their inner ends, which holes are in registry with each other and which also are in registry with a hole through the said intermediate member near its inner end, and the said lugs each having a hole extending therethrough near their outer ends, the latter hole in one of the said lugs being relatively larger than the other hole and the outer end of said intermediate member also having a hole therethrough, said holes being in registry, a fastening means extending through the first named holes for securing the lugs together and a headed pivot pin extending through the second mentioned holes, the head thereof being seated loosely within the relatively large hole in one of the said lugs and the opposite end thereof having connection with the hole in the other of said lugs, and a temple bar having a slotted pivot end and provided with a hole extending transversely therethrough through which the said pivot pin extends and the outer end portion of the said intermediate member fitting within the said slot and the said pivot end having a bridge closing the outer edge of said slot and concealing the outer end of the said intermediate member when the temple bars are in open position.

In testimony that I claim the foregoing as my invention, I have hereunto signed my name this 20th day of October, A. D. 1926.

EDGAR R. DURGIN.